United States Patent [19]
Dewing et al.

[11] Patent Number: 4,611,817
[45] Date of Patent: Sep. 16, 1986

[54] HEAVY TRANSPORT BOLSTER CONSTRUCTION

[75] Inventors: Kenneth F. Dewing, Benicia, Calif.; Donald C. Harlander, Driggs, Id.; Ralph O. Hughes, Walnut Creek, Calif.

[73] Assignee: McKay International Engineers, Benicia, Calif.

[21] Appl. No.: 427,044

[22] Filed: Feb. 28, 1983

[51] Int. Cl.$^4$ .............................................. B60P 1/00
[52] U.S. Cl. .................................. 280/145; 280/143; 280/114
[58] Field of Search ............ 280/86, 80 R, 114, 81 R, 280/143, 145, 104; 105/200, 203, 226

[56] References Cited

U.S. PATENT DOCUMENTS

| 2,332,991 | 10/1943 | Commire | 280/143 |
| 2,473,763 | 6/1949 | Mathey | 280/143 |
| 3,010,530 | 11/1961 | Risk | 280/104 |
| 3,447,815 | 6/1969 | West | 280/143 |
| 4,222,581 | 9/1980 | Treadwell et al. | 280/6 H |

Primary Examiner—Richard A. Bertsch
Attorney, Agent, or Firm—Lothrop & West

[57] ABSTRACT

A very heavy transport vehicle for off-road use has a rear axle rigidly connected to the transport frame and a front axle articulated to the transport frame not only for steering swivel motion but also for transverse relative displacement by means of dihedrally inclined planar bearing pads and planar bearing plates, the plates being mounted for limited universal movement with respect to the axle to maintain substantial stability even in rough terrain and even despite substantial lateral wind loads on high and long vehicle bodies.

5 Claims, 4 Drawing Figures

HEAVY TRANSPORT BOLSTER CONSTRUCTION

CROSS-REFERENCE TO RELATED APPLICATIONS

A related disclosure is in our co-pending patent application entitled "Steerable, Track-Type Vehicle For Bulky Loads" filed Feb. 28, 1983, Ser. No. 427,043, now U.S. Pat. No. 4,579,182.

BRIEF SUMMARY OF THE INVENTION

A very heavy transport vehicle for off-road use has a rear axle rigidly connected to a transport frame and a front axle articulated to the transport frame not only for steering swivel motion but also for transverse relative displacement by means of dihedrally inclined planar bearing pads and planar bearing plates. The plates are mounted for limited universal movement with respect to the axle. In this way substantial stability is maintained even in rough terrain and even despite substantial lateral wind loads on high and long vehicle bodies.

In many construction sites; for example, in Alaska, it is from time to time necessary to transport modules off-loaded from vessels over the tundra or generally roadless terrain to a construction site for mounting the modules on appropriate foundations. The modules may be stell or comparable metal boxes having exemplary dimensions of sixty feet in width, ninety feet in height and perhaps a hundred feet or so in length. Not only are they relatively heavy because of their construction, but likewise because of the exposed lateral areas are highly subject to disruptive wind forces.

It is therefore an object of the invention to provide a construction transporting module that can effectively operate under the given conditions and that will be relatively stable against dislodging forces not only from uneven ground but also from lateral winds.

Another object of the invention is to provide a heavy transport bolster which is in itself relatively simple, light and uncomplicated considering the job that it must necessarily accomplish.

A further object of the invention is to provide a heavy transport bolster that can readily be fabricated in the customary shop and can be readily repaired in the event it is subject to breakdown in the field.

A further object of the invention is to provide a heavy transport bolster construction that is a substantial improvement over anything that is known to us at the present time.

Other objects of the invention together with the foregoing are attained in the embodiment of the device described in the accompanying description and illustrated in the accompanying drawings.

DETAILED DESCRIPTION

Figure 1:
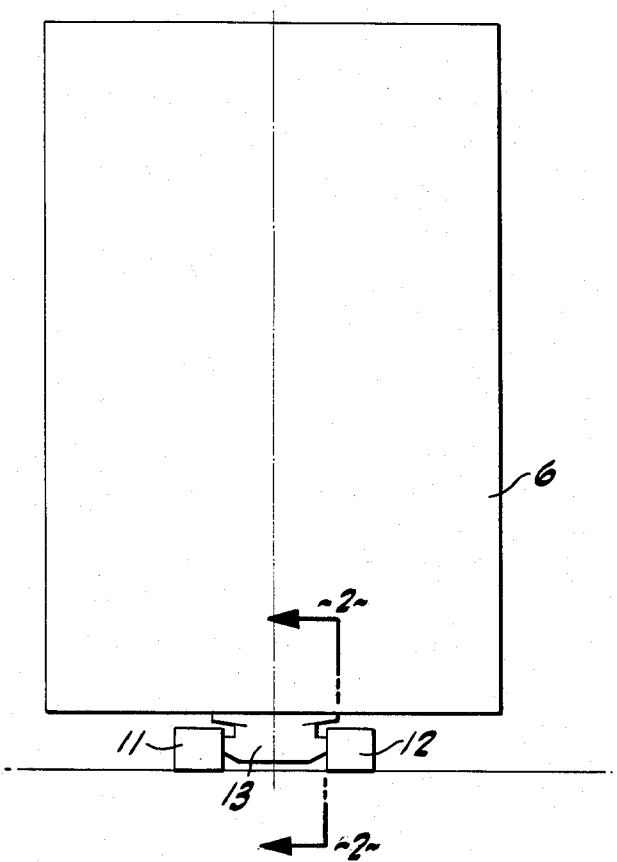
FIG. 1 is a front elevation of a device of the sort described.
Figure 2:
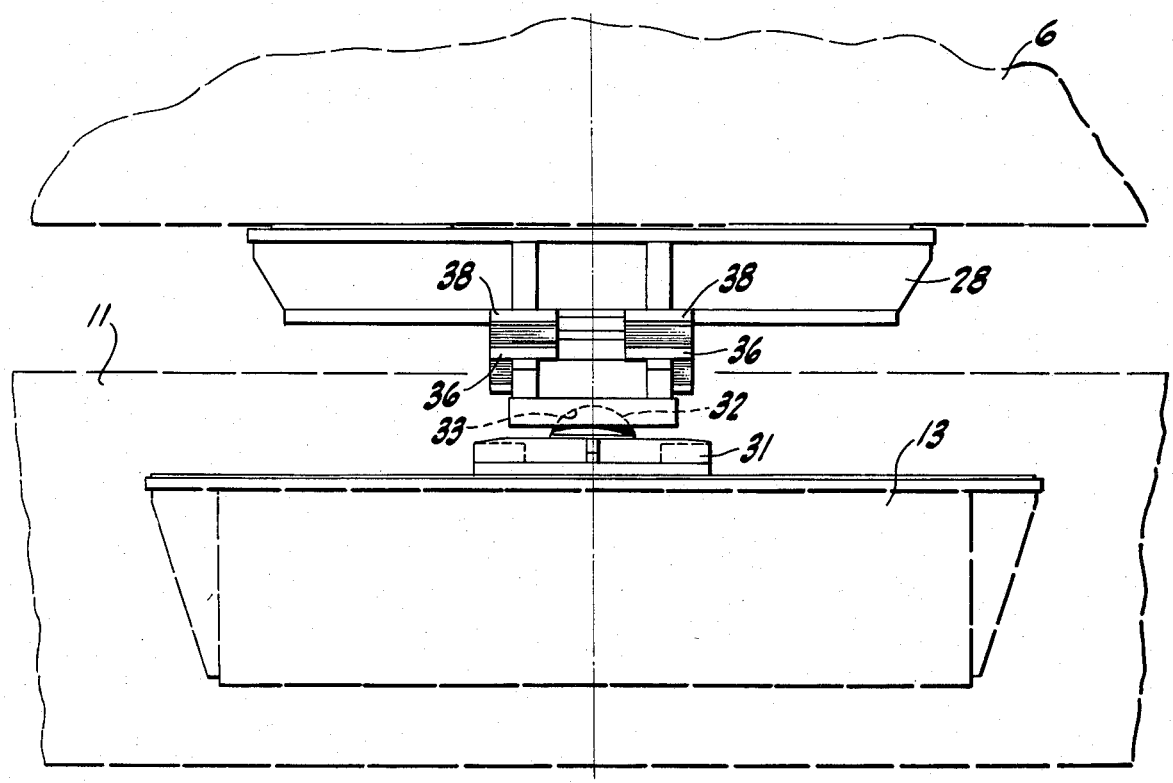
FIG. 2 is a enlarged detail showing the construction of the bolster itself as seen in a view denoted by the lines 2—2 of FIG. 1.

Although the subject matter of the present invention can readily be adapted to or embodied in a number of widely different forms, it has with considerable success been accomplished in the environment described. In this environment it is customary to have a transport module 6 substantially of the dimensions indicated and movable by off-loading and handling equipment that can land the module on a suitable transport arrangement. In this instance the transport arrangement includes a rear pair of laterally spaced ground-engaging members 7; for example, track laying units, that are connected by an appropriate intervening mechanism 8 with the body of the transport 6. The interconnection 8 is preferably such that there is no relative transverse or longitudinal freedom of motion between the transport and the support, so that irregularities of the ground in the vicinity of the ground supports 7 are transmitted to the vehicle 6 itself.

At the other, forward end, the vehicle is preferably poisted on a front pair 11 and 12 of ground-engaging elements. These can be pneumatic tires or often are track-laying trucks, the choice being immaterial in most instances. The ground-engaging members 11 and 12 are interconnected by a front axle 13, and the axle itself engages with a pivot pin 14 in a pivot housing 16 symmetrical about a vertical pivot axis 17. With this arrangement, pivotal movement is easily feasible. However, there are some limitations on other motions. That is, the axle 13 is provided with a generally circular plate 18 fixed on the axle 13 and serving as a support for a separate circular table 19 of a similar diameter and for a transversely extending table beam 31. The plate 18 and table 19 are relatively rotatable about the axis 17. These members 18 and 19 are constrained not only by the vertical pin 14 but also by a longitudinal pin 21 for relative motion about a longitudinal or fore and aft horizontal axis and also by a transverse pin 22 so that the elements are interconneced for relative rotation about a transverse horizontal axis.

Particularly pursuant to the invention, the table beam 31 on each side of the axis 17 is provided with a mated pair of devices for universally connecting the table beam 31 with respect to the transport module 6. For example, on one side of the axis 17 there is upstanding from the table beam 31 at one end thereof a partial ball 23 having a spherical upper surface 24 contacting with a similar, downwardly directed spherical lower surface 26. This surface 26 is on a block 27 extending below and carrying one end portion of a transverse body supporting beam 28 spanning the forward portion of the body module 6. In mirror symmetry on the opposite side of the axis 17, the table beam 31 also has an upstanding partial ball having a spherical upper surface 32 interfitting with a concave spherical surface 33 in the lower portion of a bearing block 36 below and engaging the supporing beam 28. The block 27 and the block 36 have inclined sliding relationships with the beam 28. To provide appropriate abutting and sliding surfaces, pairs of planar pads 37 and 38 and planar plates 37' and 38' are fastened to the respective blocks 27 and 36 and to the beam 28 and allow transverse relative sliding movement.

Figure 3:
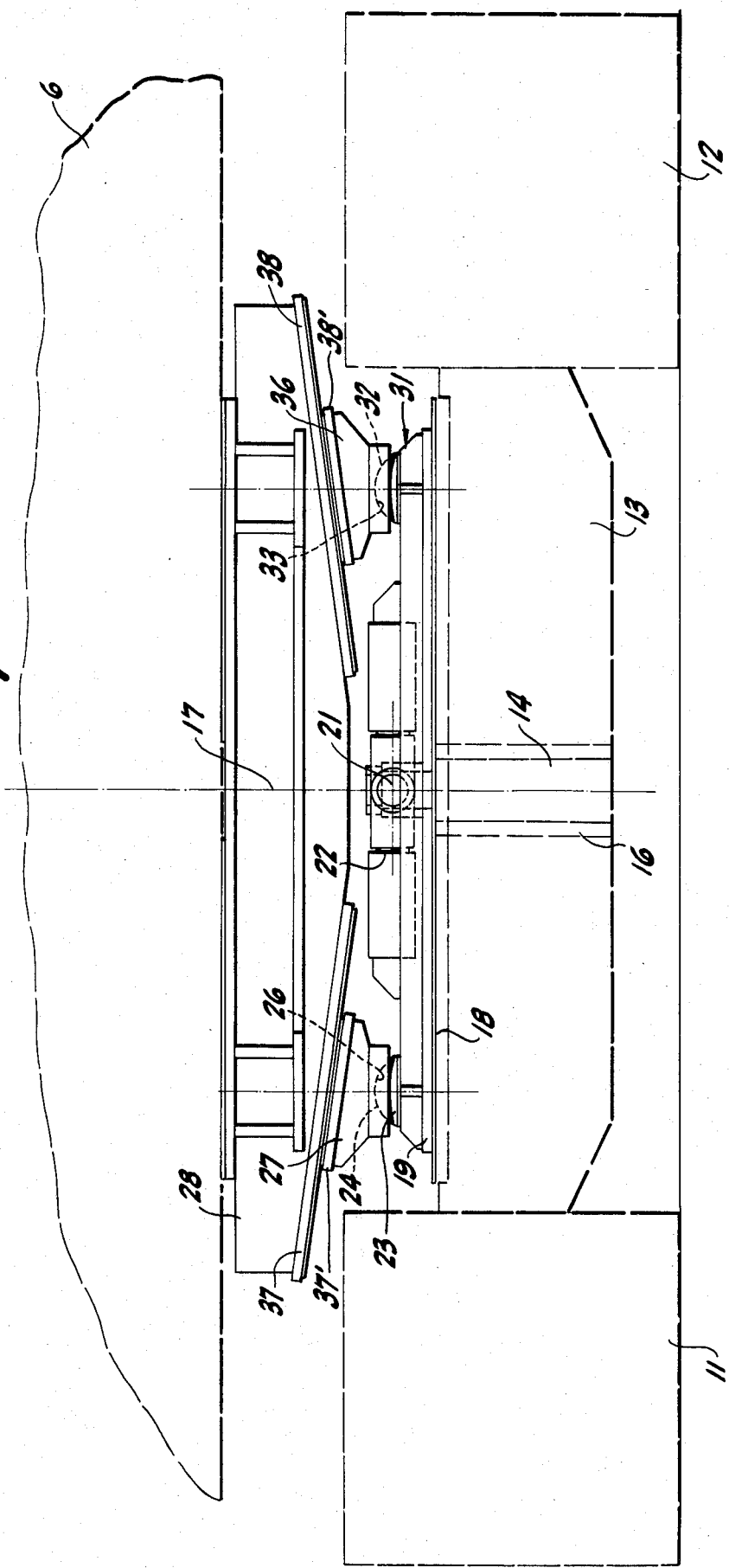
FIG. 3 is a view comparable to that of FIG. 1 but omitting much of the transport and showing the bolster to an enlarged scale.
Figure 4:
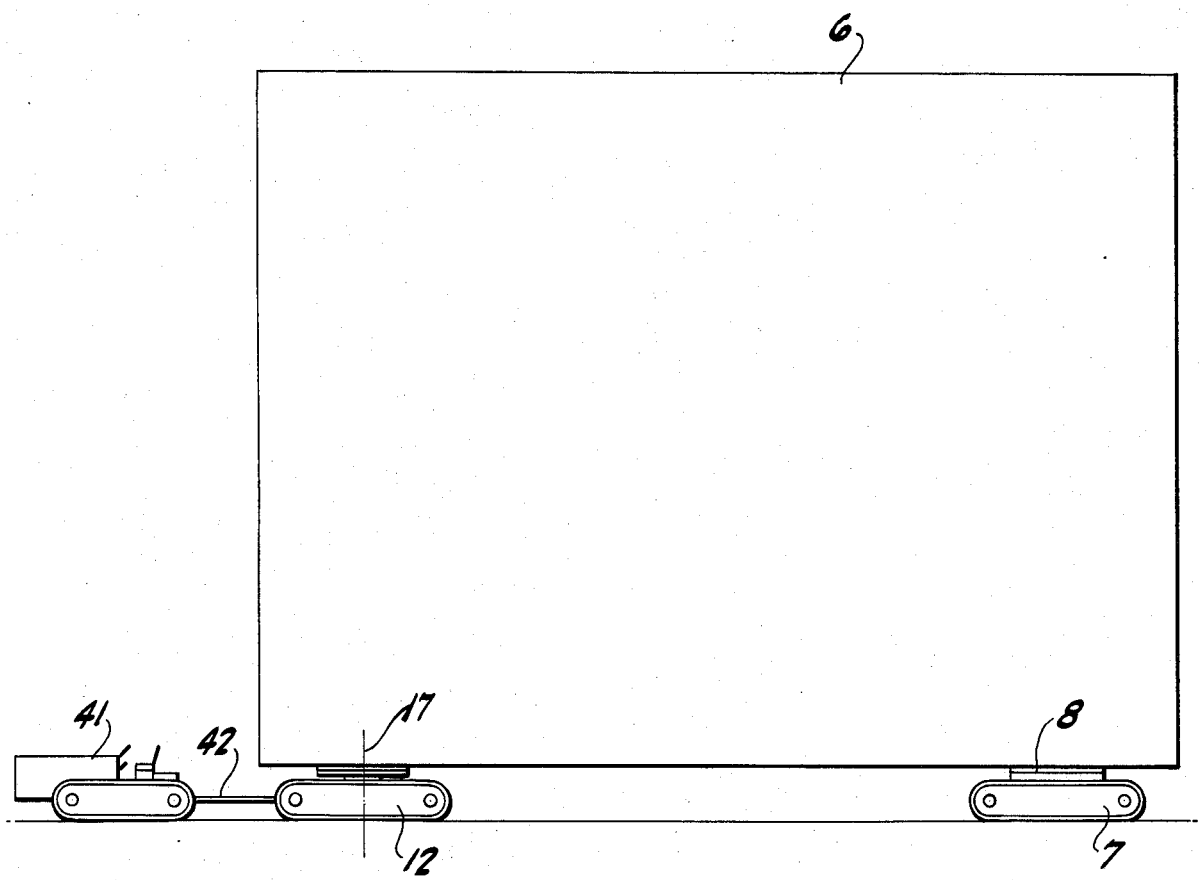
FIG. 4 is a view in side elevation of a structure pursuant to the invention and in use.

This arrangement is effective, when the cross beam 28 and the module 6 are displaced laterally relative to the front axle 13, for instance to the left in FIG. 3, to cause one pair of abutting planar members, such as the pad 37 and plate 37', to slide over each other at increasingly steep angles, as permitted by the spherical surfaces 24 and 26. During this lateral relative motion the pad 38 and plate 38' slide over each other at increasingly shallow angles. Perpendicular lines from these pairs of surfaces extending upwardly from comparable points on each pair intersect at points to one side of the symmetrical center of the module and on the side of such center affording increased stability over an arrangement in which the sliding surfaces are arcuate about a point on the center of symmetry. These inclined sliding members are effective to increase stability for rocking motion on both sides of center.

In this way the forward portion of the body 6 is stably supported. There is not only a steering capability with respect to the front axle, but also the forward portion of the body has an ability safely to move tranversely with respect to the center line 17 or with respect to the front axle.

This is important because in the normal transport of a load of this sort there is provided a tractor vehicle 41; for example, a track-laying tractor, connected to the front axle 13 through a draw bar 42. The tractor is capable of proceeding directly ahead and also is capable of maneuvering; for example, to a right angle with respect to the previous direction of advance, so that the draw bar 42 sometimes extends transversely to the longitudinal dimension of the body 6. Under these circumstances, the ground-engaging members 11 and 12 pivot around the axis 17, the plate 18 rotating underneath the table 19, and the bearing shell 16 rotating around the pin 14 until the new position has been acquired. During this time the forward weight on the body 6 is transmitted through the pairs of pads 37 and 38 and plates 37' and 38' to the spherical members 24 and 32, and from such members to the table beam 31 and the table 19, so that good stability is maintained.

Whenever there is lateral or transverse displacement of the axle 13 with respect to the vehicle body 6 or, conversely, whenever there is transverse displacement of the body 6 at the forward end thereof with respect to the axle 13, then the pads 37 and 38 and the plates 37' and 38' slide with respect to each other, such shifting being accompanied by a change in angularity of the bearing plates and the bearing pads with respect to the axle 13 as permitted by the universal joints or connections 24 and 32.

With this arrangement, it is simple and safe to connect the towed vehicle to a tractor and to transverse undulatory and uneven terrain even in a strong transverse wind (winds in excess of 40 m.p.h. being encountered) and still to guide and lead the trailed vehicle to its destined site with only some stabilizing transverse shifting of the forward construction. It is true that the rear axle connection to the body assists in maintaining that portion of the module 6 in accordance with the support afforded by the terrain, but the front axle allows freedom of movement so that there is in effect a three-point suspension of the heavy and awkward load without sacrificing stability of the vehicle.

We claim:

1. A heavy transport bolster construction comprising a pair of tranversely spaced ground-engaging members, and axle engaging said members and spanning the space between them, a supporting beam disposed generally transversely above said axle, a pair of oppositely inclined planar bearing pads on the bottom of said beam near the ends thereof, a pair of planar bearing plates each abutting a respective one of said bearing pads, a pair of bearing blocks respectively carrying said bearing plates, a table beam below said body supporting beam, and means defining a ball and socket connection between said bearing blocks and said table beam.

2. A device as in claim 1 in which said bearing pads and said bearing plates have engaging surfaces on opposite sides of the center of said table beam and said supporting beam and are inclined upwardly and outwardly from the center thereof.

3. A device as in claim 1 in which said means for mounting said bearing plates on said table beam are partial ball joints.

4. A device as in claim 1 including a main frame, a rear pair of ground-engaging members transversely spaced apart at the rear end of said frame and rigidly coupled thereto, a front pair of ground-engaging members transversely spaced apart at the front end of said frame, means for connecting said front pair of members and said frame for relative pivotal movement about a vertical axis, and means for coupling said front pair of members and the front portion of said frame for relative transverse sliding movement along oppositely inclined planes extending upwardly and outwardly on opposite sides of said axis.

5. A device as in claim 4 in which said transverse sliding movement is accompanied by a relatively steep lifting motion of said frame on one side and a relatively shallow lowering movement of said frame on the other side.

* * * * *